N. LIBISON.
FLY TRAP.
APPLICATION FILED JUNE 16, 1913.
1,084,647.
Patented Jan. 20, 1914.
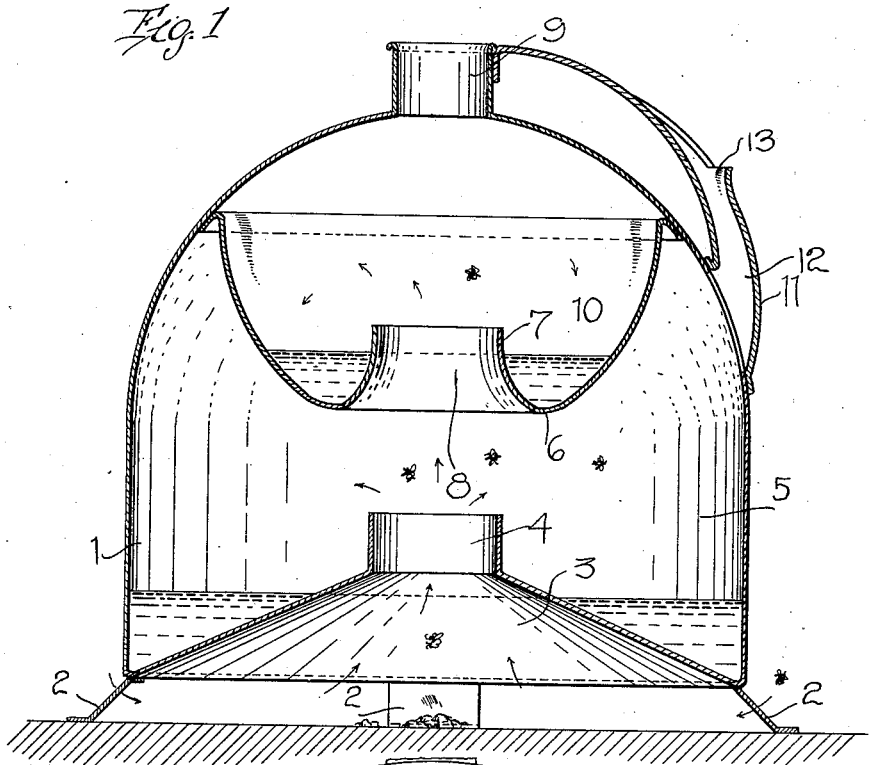
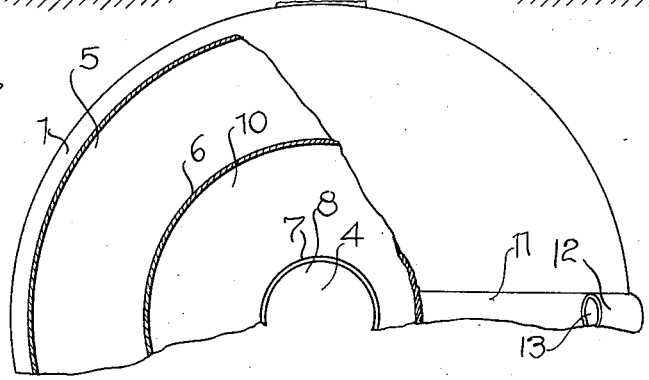
Witnesses
Robert M. Sutphen
A. I. Hind.
Inventor
NICHOLAS LIBISON
By Watson E. Coleman
Attorney

UNITED STATES PATENT OFFICE.

NICHOLAS LIBISON, OF HOMESTEAD, PENNSYLVANIA.

FLY-TRAP.

1,084,647.  Specification of Letters Patent.  Patented Jan. 20, 1914.

Application filed June 16, 1913. Serial No. 774,069.

*To all whom it may concern:*

Be it known that I, NICHOLAS LIBISON, a citizen of Austria-Hungary, residing at Homestead, in the county of Allegheny and State of Pennsylvania, have invented certain new and useful Improvements in Fly-Traps, of which the following is a specification, reference being had to the accompanying drawings.

This invention relates to new and useful improvements in traps and more particularly to fly traps, the object of the invention being to provide an efficient trap of the above character and also to add to the general construction of devices of this class of desirable improvements which will be hereinafter described.

Another object of the invention is to provide a device of the above character which will possess advantages in points of efficiency and durability, is inexpensive of manufacture and at the same time is simple in construction and operation.

With the above and other objects in view, this invention consists in the novel features of construction and the combination and arrangement of parts to be hereinafter more fully described, pointed out in the claim and shown in the accompanying drawings, in which—

Figure 1 is a vertical sectional view of a fly trap constructed in accordance with my invention; Fig. 2 is a top plan view, parts being broken away and in section.

In carrying out my invention, I propose to construct the body of my trap in some desirable shape which will furnish a suitable design, but in the present instance as will be seen in the accompanying drawings, the body is in the shape of a demijohn or what is commonly known as a jug. The body 1 of the jug is provided at its bottom with the radially projecting legs 2, and the bottom is further formed concave in shape as shown at 3 and provided with a central opening 4.

The body 1 forms a suitable chamber 5 in which is placed a solution of equal parts of water and vinegar. The upper or shoulder portion of the body is separated from the chamber in the body 1 by means of a concave partition 6 which is provided at its central portion with an upwardly projecting neck 7 having a central opening 8 which forms communication between the chamber 5 and the opening in the neck 9 of the body. From this it will be apparent that the openings 4 and 8 and the neck 9 form a continuous opening from the bottom of the body to the top. It will also be readily apparent that by the arrangement of the partition 6 that a second chamber 10 is provided in which is placed a solution similar to that placed in the chamber 5.

A handle member 11 is provided, the upper end of which is secured to the upper end of the neck 9 and the lower end, which is tubular in form, as shown at 12, is integrally formed with the body 1 and adapted to communicate with the chamber 5. The upper end of the hollow portion of the handle is provided with an opening 13 whereby the chamber 5 may be quickly and readily filled or emptied.

From the above description taken in connection with the accompanying drawings, it will be readily seen that in order to get the flies to enter the chamber, a little sugar or other suitable material which will serve as an attraction for the insects is placed beneath the bottom of the body and as the fly leaves it will no doubt fly upward, going through the opening 4, into the chamber 5. After the insect has entered the chamber 5 his downward course will be checked by the solution in which it is drowned. If the insect continues its passage up through the opening 8 it will be drowned in the solution contained in the chamber 10. In filling the chambers with the solution, the chamber 5 is filled and also emptied by means of the hollow handle portion 12. The chamber 10 is filled and emptied through the neck 9. From this it will be readily apparent that I have provided a simple and durable fly trap which is not only simple in its construction but is constructed of a suitable ornamental design and is extremely inexpensive of manufacture, the same, if desired, being made of tin, aluminum or any other desirable material.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

In a device of the class described, the combination with a hollow body having a partition to divide the same into chambers, of a handle member formed on said body and having its lower portion hollow, said lower portion having communication with the interior of the body and the exterior of the handle whereby the lower chamber may be readily filled when desired.

In testimony whereof I hereunto affix my signature in the presence of two witnesses.

NICHOLAS LIBISON.

Witnesses:
 PIT BARDAS,
 JOHAN LIBISON.

Copies of this patent may be obtained for five cents each, by addressing the "Commissioner of Patents, Washington, D. C."